United States Patent

[11] 3,522,826

[72] Inventors: Evander M. Ervin
 Florence, South Carolina;
 Richard Ferguson, Charlotte,
 North Carolina; Charles V. Hinton,
 Charlotte, North Carolina
[21] Application No.: 716,564
[22] Filed: March 27, 1968
[45] Patented: Aug. 4, 1970
[73] Assignee: Terlesco, Inc.
 Charlotte, North Carolina
 a Corp. of North Carolina

[54] APPARATUS FOR CYLINDRICALLY SIZING ELONGATED WORK PIECES
 7 Claims, 3 Drawing Figs.
[52] U.S. Cl. .................................................. 144/4,
 144/23, 143/85
[51] Int. Cl. .................................................... B27m 3/00,
 B27b 33/18
[50] Field of Search ........................................ 144/4, 208-
 5, 23, 14, 12, 30; 142/46, 31, 32, 36; 143/85, 85-1

[56] References Cited
 UNITED STATES PATENTS

| | | | |
|---|---|---|---|
| 2,545,931 | 3/1951 | Samsky ....................... | 142/32X |
| 3,019,825 | 2/1962 | Herolf .......................... | 144/208-5 |
| 3,163,190 | 12/1964 | Ervin ............................ | 144/4X |
| 3,189,068 | 6/1965 | Brundell et al. .............. | 144/208-5 |

*Primary Examiner*— Gil Weidenfeld
*Attorney*— Channing L. Richards, Dalbert U. Shefte and Francis M. Pinckney

ABSTRACT: Elongated work pieces, such as wooden billets, are efficiently sized to a desired cylindrical cross section by feeding them through a tubular cutting head fitted with teeth presenting cutting edges that extend from an inner diameter path corresponding to the size of cylindrical cross section desired outwardly to an extent sufficient for circumscribing the work piece cross section at the axial relation of feeding through the cutting head, so that axial alignment of work piece and cutting head is unnecessary and may be set eccentrically to eliminate defects in the work piece as the sizing is accomplished.

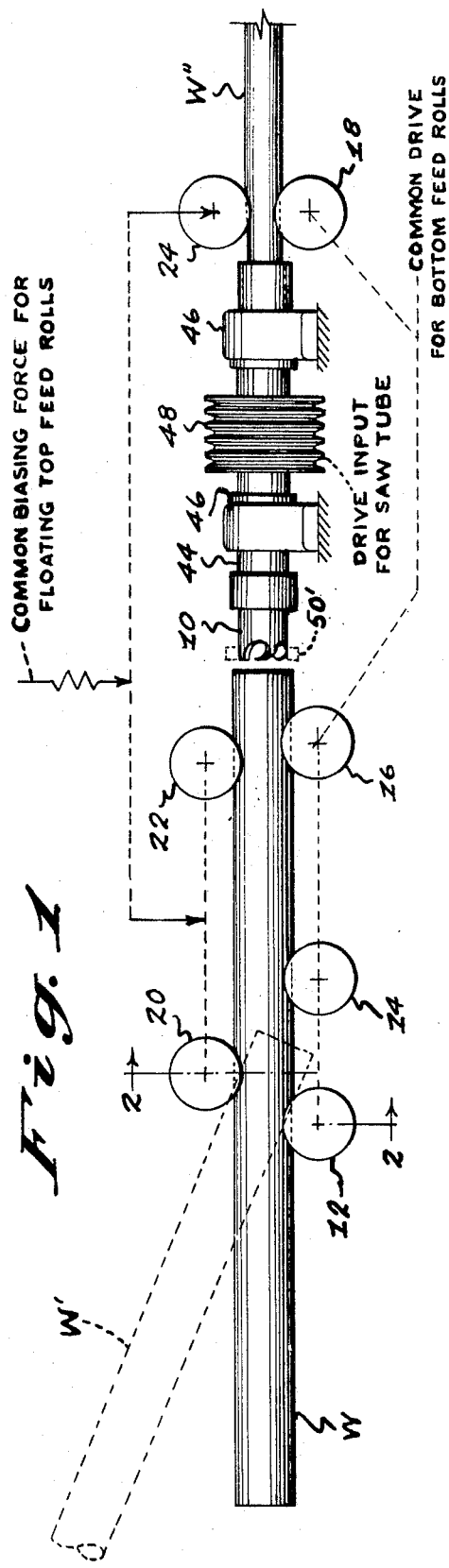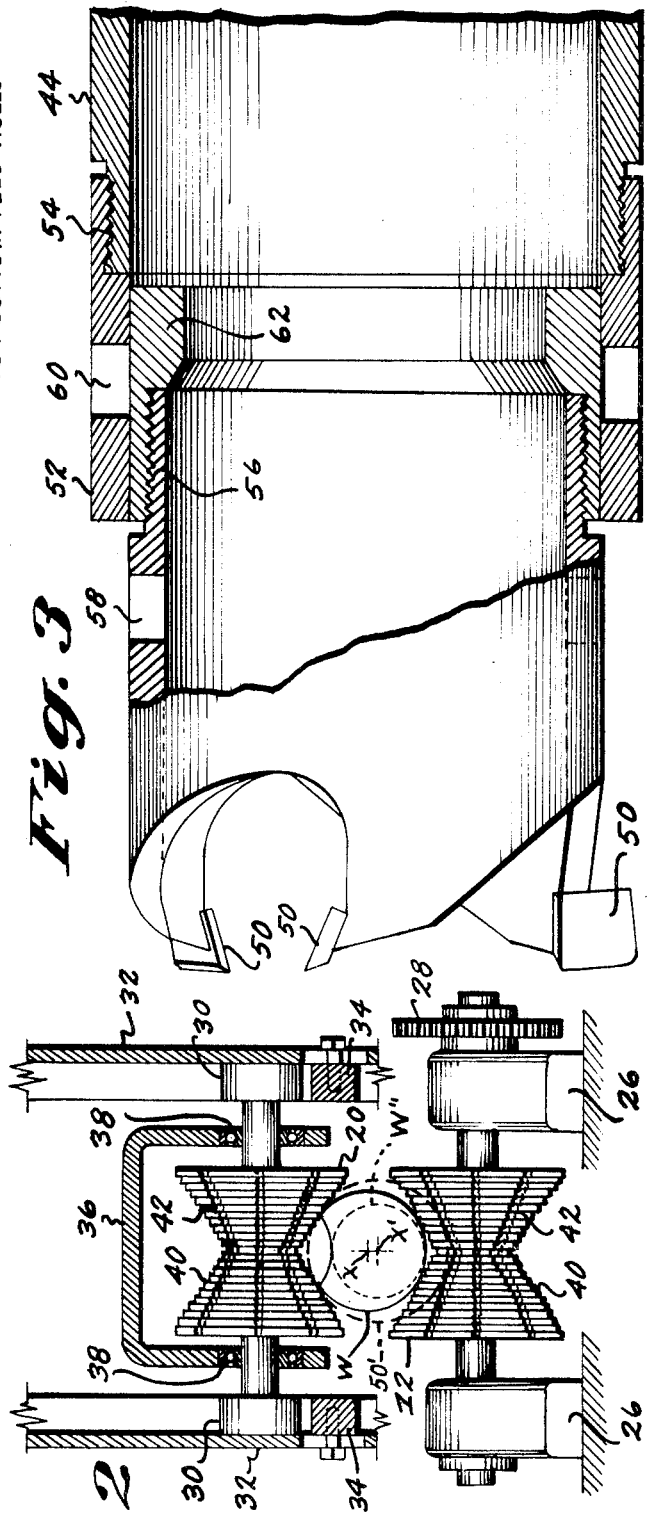
INVENTOR
EVANDER M. ERVIN
RICHARD FERGUSON &
BY CHARLES V. HINTON
Channing L. Richards &
Dalbert U. Shefte
ATTORNEYS

U.S. PATENT 3,522,826
APPARATUS FOR CYLINDRICALLY SIZING ELONGATED WORK PIECES

BACKGROUND OF THE INVENTION

Tubular sawing is commonly employed to cut a cylindrical, and usually elongated, work piece in multiples from a piece of stock. An example is the cutting of elongated wooden billets from log sections with tubular sawing apparatus of the sort disclosed by U.S. Patent No. 3,163,190. When the tubular sawing is done commercially on a production basis a certain percentage of the objects cut can be expected to be defective by reason of imperfections appearing at their cylindrical surface for one reason or another.

This is particularly true when objects of elongated form are being cut, and when they are being cut from relatively rough and irregularly shaped stock, such as the log sections mentioned above. Thus, internal knots or cracks or the like in the log section stock may show up in a cut billet; or a cut adjacent the periphery of the log section may be inadvertently spaced so close as to pick up some of the bark; or the tubular saw may exhibit a tendency under certain conditions to run off from its axial path towards the end of the cut sufficiently to intersect a void left from a previous cut and thereby recess the billet surface to the extent of the intersection.

A high proportion of the imperfections resulting from these causes and others of the same sort are of local character and are almost always situated at one side of the cylindrical billet cut so as to leave sufficient sound wood for a usable billet of smaller diameter through off-center resizing. The present invention makes such off-center resizing a practical possibility through a special arrangement of means for this purpose.

SUMMARY OF THE INVENTION

The apparatus provided by the present invention arranges a tubular cutting head or saw to perform a doweling operation in effect; that is, to size cylindrically single elongate work pieces fed successively thereto. For this purpose the cutting head employed differs from the usual tubular sawing means in that its teeth, rather than being shaped to form a circular kerf, are provided with cutting edges of sufficient extent to reduce the work pieces to the cylindrical size desired. Also, the throat of the cutting head is specially arranged to assist in controlling the work pieces properly as they are fed therethrough. A particular advantage of the resulting apparatus arrangement is that there is no need for centering the work pieces as they are fed through the cutting head, nor is there any necessity for providing work pieces of a particular shape or condition, All that is needed is an elongated work piece containing a sound cylindrical volume of the size desired, such as the imperfect tubular sawn billets of the sort previously mentioned for which the representative embodiment now to be described is particularly designed.

DESCRIPTION OF THE DRAWINGS

FIG. 1 is a diagrammatic side elevation of apparatus representatively embodying the present invention;

FIG. 2 is an enlarged sectional detail taken substantially at the line 2-2 in FIG. 1 to illustrate further the feed roll arrangement; and FIG. 3 is an enlarged side elevation, partly sectioned, to show the particular arrangement of a suitable tubular cutting head.

DESCRIPTION OF THE PREFERRED EMBODIMENT

As seen in FIG. 1, an imperfect tubular sawn billet is indicated at W in position for feeding to a tubular cutting head 10 for resizing, while the manner of inserting the billets for feeding is indicated in dotted lines at W' and the removal of the resized billet at W''.

Feeding of the billets W for resizing and removal of the resized billets W'' is accomplished by a feed roll system having a bottom or supporting roll series as at 12, 14, 16 and 18, and an opposing set of gripping top rolls 20, 22 and 24. FIG. 2 shows the character and respective arrangements of the initial bottom roll 12 and top roll 20, which are representative of the others.

As seen in FIG. 2, the bottom roll 12 is fixed at a level such that the billet W being handled is fed to the tubular cutting head 10 for off-center resizing (as indicated by the dotted W'' circle) in relation to its supported bottom side. The other two bottom rolls 14 and 16 ahead of the tubular saw 10 are fixed at the same level, while the level of the final bottom roll 18 provided for removal of the resized billet W'' is set differently enough to support the emerging billet in axial alignment with the cutting head 10.

The bottom rolls 12-18 are each carried in pillow blocks (as at 26 in FIG. 2) for fixed mounting on the frame structure of the apparatus. Such mounting should include some provision for vertical adjustment so that the level of the bottom rolls can be set in relation to the size of cutting head 10 being used, but once such setting is made the bottom rolls are locked in place so as to remain fixed. The supported shaft of each bottom roll 12-18 is also fitted with a sprocket wheel (as at 28 in FIG. 2) so that they may be driven as a group from a common drive input as indicated in FIG. 1.

The opposed set of top rolls 20-24 are floated in idler relation to complete the feed roll system. For this purpose both ends of each top roll shaft are fitted with positioning roll elements (as at 30 in FIG. 2) that ride in vertical locating channels 32 mounted on the apparatus frame structure and equipped with adjustable stop blocks 34 that may be set to limit downward movement of the respective top rolls 20-24 to a position at which they are always spaced sufficiently from the bottom rolls to allow insertion of a billet W' readily for feeding, while being lifted off the stop blocks 34 to a floating disposition whenever feeding is in progress.

The opposed relation of the floating top rolls 20-24 is maintained from a common biasing force, as indicated in FIG. 1, through means leaving each roll independently free to float individually. FIG. 2 shows the means for applying the biasing force at the top roll 20 to include a straddling channel member 36 carrying bearing inserts 38 in its depending legs for riding the shaft of top roll 20. Extension of the channel member 36 to the adjacent top roll 22 for similar riding arrangement there makes it possible to load both of the rolls 20 and 22 by applying a component of the common biasing force therebetween as indicated in FIG. 1. By then bridging from this loading point at channel 36 to the remaining top roll 24, and applying the common biasing force to this bridging, a loading of all three top rolls is achieved, while it is only necessary to apply the loading to the channel member 36 through a knuckle or ball and socket joint to leave each top roll independently free for individual floating. The loading system thus provided also makes it possible to divide the common biasing force between the respective top rolls in any relation desired. The arrangement diagrammed in FIG. 1 results in equal loading of all three rolls, but if it were desired to apply a heavier load at the final top roll 24 to increase the removing grip on the resized billets W''', or to lighten the load at the initial top roll 20 to ease the insertion of the imperfect billets W thereat, it is only necessary to shift the loading division points in accordance with the different load distribution wanted.

All roll members of the feed roll system have double cone bodies for handling the basically cylindrical shape of the imperfect tubular sawn billets W that are to be resized by the illustrated embodiment of the invention. Also, to hold the billets W against turning as they are fed through the saw head 10 the rolls are circumferentially grooved, as seen at 40 in FIG. 2, and are additionally grooved axially as seen at 42 to insure maintaining an effective feed. The circumferential grooves 40 are formed contiguously or substantially so throughout the double cone surface of the roll bodies, while the axial grooves 42 are spaced suitably at about 45° intervals in the double cone surface to renew the feed roll bite whenever feeding resistance must be overcome.

The entrance station of the illustrated feed roll system is formed by a cluster of two spaced bottom rolls 12 and 14 and a top roll 20 staggered therebetween. The spacing of this entrance roll cluster is such that an entering work piece W' may be levered between the first bottom roll 12 and the top roll staggered thereabove to lift the latter readily against its loading bias, so as to develop a feeding bite easily on the work piece as it is manipulated to a horizontal position for riding onto the second bottom roll 14 of the entrance cluster to continue feeding through the apparatus. In instances where it was desired to use conveyor means for delivering the imperfect billets W to the feeding system, the initial top roll 20 would preferably be arranged above only a single bottom roll, and it has already been noted that the loading may be lightened to ease the insertion threat. Alternatively or additionally the diameter of the initial top roll 20 may be increased so that it will ride up on the conveyor delivered billet before the initial feed roll bite is entered, or means sensitive to the approach of a billet on the conveyor may be provided to lift the initial top roll 20 momentarily for the billet entry.

The second feeding station formed by the bottom roll 16 and the top roll 22 is located adjacent the cutting head 10 to deliver the work piece W thereto. The bottom roll 16 at this station should be spaced sufficiently from the cutting head 10 to allow removal of the latter whenever it requires sharpening or changing, but is placed as close as this limitation will allow. The related top roll 22 is preferably located somewhat in advance of the bottom roll, or at a greater spacing from the cutting head 10, so that the floating top roll bias will have no tendency to force the leaving end of a work piece W downwardly as the feeding bite at this station is released.

The cutting head 10 of the illustrated embodiment, to which the work piece W is fed in the manner noted above, is carried on a tubular spindle 44 that is mounted for rotation in a pair of fixed pillow blocks 46 between which it carries a multi-V sheave 48 to receive a drive input as indicated in FIG. 1. The illustrated form of cutting head 10 corresponds in basic character to the tubular saw disclosed in copending application Serial No. 549,514, filed May 12, 1966, now U. S. Patent No. 3,387,637, except for the previously noted modification of the tooth bits 50 to present cutting edges of sufficient extent to reduce the work pieces W to the cylindrical size desired. Actually, it is not necessary that the cutting head 10 have the character of a tubular saw. Any tubular carrier fitted with suitable cutting elements for the resizing to be done would work as well. For example, the cutting elements might be tool bits held transversely to the billet axis by the carrier and sharpened along the attacking side to present the requisite cutting edges. However, where it is tubular sawn billets that are being resized, it will usually be most convenient to use a tubular saw of the sort available for the initial tubular sawing operation and modify the tooth bits for the resizing work.

The modification of the tooth bits 50 for this purpose consists in forming them with an outwardly flared configuration so that their cutting edges extend from an inner diameter path corresponding to the cylindrical sizing desired outwardly to an extent sufficient for circumscribing or encircling the cross section of the work pieces W being sized at the axial eccentricity resulting from the off-center feeding needed for handling the work pieces being dealt with. The encircling sweep of the tooth bits 50 is indicated by dotted lines in FIG. 2 at 50' in relation to the indicated axis x' of the cutting head 10, while the offset axis of the work pieces W is indicated at x to illustrate the axial eccentricity necessarily selected for the representative situation shown.

Mounting of the saw head 10 on the tubular spindle 44 is accomplished through an adapter collar 52 that threads on the spindle 44 as seen at 54 in FIG. 3, and receives the saw head 10 for threaded engagement at 56. Both the saw head 10 and the adapter collar 52 are formed with spanner wrench or drift pin holes 58 and 60, respectively, for setting and releasing the above-noted threaded engagements. Use of the adapter collar 52 makes it possible to fit the spindle 44 with saw heads 10 of different sizes by simply providing a collar 52 for each saw head size.

Also, the adapter collar 52 serves the additional purpose of providing a throat restricting portion 62 at the base of the saw head 10 for maintaining the feeding alignment of the work pieces W during the interval after their trailing end has left the delivery feed rolls 16 and 22 and before it has completely passed the saw teeth 50. If the feeding alignment is not maintained during this interval the trailing end of a work piece W being fed will tend to sag upon losing the support of the last delivery feed roll 16 so as to distort the sizing at this trailing end.

Such a result is prevented by providing the throat restricting portion 62 at an inner diameter closely fitting the sized work piece as it passes therethrough. The adapter collar 52 is conveniently arranged to provide the throat restricting portion 62 by forming the latter as a beveled shoulder in an insert that also includes the threaded portion 56 for engaging the saw head 10, and then securing this insert within the outer portion of the adapter collar 52 by welding or the like. When the throat restricting portion 62 is formed to an inner diameter exceeding that of the sized work piece by about 1/32" over an axial length of about 1", the final feeding alignment is maintained nicely without impeding the feeding movement materially.

The feeding movement is completed by the final set of feed rolls 18 and 24 situated beyond the saw head 10 and the spindle 44 on which it is carried. The aggregate axial length of assembled saw head 10 and spindle 44 is proportioned so as to be substantially less than that of the work pieces W being handled, so that the emerging sized work pieces W" reach the bite of the final feed rolls 18 and 24 before the feeding bite of the final delivery rolls 16 and 22 is released. For example, in adapting the illustrated embodiment for handling imperfect tubular sawn billets in lengths from 30" upward, the aggregate length of saw head 10 and spindle 44 is restricted to about 20".

Apparatus of the sort illustrated provides an exceptionally practical means for resizing imperfect tubular sawn billets as previously mentioned. A common initial size range for such billets is 3", 2-1/2", and 2" in nominal terms, and the practical resizing relations involved are as follows:

| Imperfect billet W | | Resized billet W" | |
|---|---|---|---|
| Nominal size, inches | Actual diameter, inches | Nominal size, inches | Actual diameter, inches |
| 3 | 3 13/32 | 2½ | 2 25/32 |
| 2½ | 2 25/32 | 2 | 2 9/32 |
| 2 | 2 9/32 | 1½ | 1 7/8 |

The rough tubular sawn billets are provided in the actual sizes indicated so that they will finish to at least the corresponding nominal size. When the billets are imperfect, it is commonly this finishing margin from actual to nominal size that is impaired and, as previously noted, the imperfection is characteristically localized at a side of the billet. Accordingly, with apparatus embodying the present invention as described above, it is only necessary to insert the imperfect billets for feeding with the imperfections disposed or facing upwardly to take advantage of the off-center alignment with the saw head 10 for producing a sound billet of the next lower size from which the imperfection has been cut away. Thus, in FIG. 2 the dotted circle W" represents the resized billet that will be reclaimed from the work piece W that is imperfect because of a recessed side resulting from inadvertent intersection with an adjacent void during an initial tubular sawing operation.

For operation in the size range just indicated, the tubular spindle 44 is sized to accommodate the largest size of saw head 10 needed, and differing adapter collars 52 are used for interchanging saw head sizes within the range required. The saw heads 10 preferably have a three-tooth configuration as indicated, and they should be run at a spindle speed of about 1400 r.p.m., which may be accomplished from a 15 h.p., 1800 r.p.m., three-phase motor driving the multi-V sheave 48 on the spindle 44 at the indicated reduction. The saw head teeth 50 are provided with 7/8" cutting edges to insure an encircling cut at the off-center feeding alignment.

The driven bottom feed rolls 12-18 are proportioned to provide an effective diameter yielding a feed rate of 8-3/4" per revolution when handling a work piece W of 2-1/2" nominal size. The feed rate will, of course, be slightly less for a smaller nominal size and somewhat more for a greater size. The feed roll drive may be powered from 1/4 - 1/2 H.P. motor preferably connected through a variable speed means to allow speed adjustment at the feed rolls in the range from about 55 to 95 r.p.m. A bottom roll operating speed of about 66 r.p.m. has been found generally satisfactory. The top feed rolls 20-24 should each be loaded at about 500 pounds, which may be done readily from 50 p.s.i. air pressure applied through a 30 square inch diaphragm-type air cylinder to provide the previously mentioned biasing force at 1500 pounds.

The result of apparatus such as is represented by the embodiment illustrated and described is an effective cylindrical sizing device that is readily fed at attractive production rates and that allows the cylindrical sizing to be done without any need for centered feeding of the work piece. As noted earlier, the work pieces to be sized need not be provided in any particular shape or condition. Work pieces of square cross section, for example, may be handled just as readily as the tubular sawn billets referred to above. If the work pieces have a cross section other than round, the apparatus feed rolls may need some corresponding modification for handling them appropriately, but the apparatus will serve otherwise without change and in the same manner for the sizing operation.

It will be apparent that the condition of the work pieces being handled will determine the degree of axial eccentricity between feed rolls and cutting head that needs to be selected. If generally sound work pieces of square cross section are being handled, it will obviously be desirable to approach on-center axial alignment in order to produce the largest cylindrical size practicably possible, although there will still be no operating need for exact on-center alignment, and the apparatus will remain capable of selective setting to the axial relation between feed rolls and cutting head that is needed for the particular shape and condition of the work pieces at hand.

This invention has been described in detail above for purposes of illustration only and is not intended to be limited by this description or otherwise except as defined in the appended claims.

We claim:
1. Apparatus for cylindrically sizing elongated work pieces comprising a tubular cutting head supported for rotation about its axis and fitted with teeth formed to present cutting edges extending in transverse relation to said axis from an inner diameter path corresponding to the cylindrical sizing desired outwardly to an extent sufficient for circumscribing the cross section of the work pieces to be sized at a selected axial eccentricity of the work pieces in relation to the cutting head axis, means for rotating said cutting head, and means for feeding a work piece through said cutting head at said selected axial eccentricity.

2. Apparatus as defined in Claim 1 and further characterized in that said cutting head is provided with a restricted throat portion having an inner diameter closely fitting the diameter of a work piece sized by said teeth for maintaining the axial alignment of the sized work piece with respect to said cutting head as the sizing is completed.

3. Apparatus as defined in Claim 1 and further characterized in that said cutting head is a tubular saw.

4. Apparatus as defined in Claim 1 and further characterized in that said feeding means includes means for delivering a work piece to said tubular cutting head at said selected axial eccentricity and means for removing a sized work piece axially from said tubular cutting head, and in that the aggregate length of said tubular cutting head is substantially less than that of the work piece being sized.

5. Apparatus as defined in Claim 1 and further characterized in that said feeding means comprises at least two supporting feed rolls spaced on fixed axes ahead of said cutting head and at least one beyond, with opposed gripping rolls arranged in relation to each of said supporting rolls, the supporting rolls ahead of said cutting head being fixed at a level determining said axial eccentricity and being driven together with said supporting roll beyond the cutting head, and the opposed gripping rolls being loaded from a common biasing force through means leaving each roll independently free to float individually.

6. Apparatus as defined in Claim 5 and further characterized in that the initial gripping roll of said feeding means is arranged for transient displacement against the bias thereon for accepting an entering work piece readily.

7. Apparatus as defined in claim 6 and further characterized in that the supporting feed rolls ahead of said cutting head include an initial pair of such rolls spaced in staggered relation to an opposed initial gripping roll, whereby a work piece may be inserted for feeding by levering the leading end thereof between the first supporting roll of said initial pair and the opposed gripping roll staggered thereat for readily overcoming the bias on the latter in directing the leading end of the work piece to a supported position on the second supporting roll of said initial pair.